(12) United States Patent
Kozasa et al.

(10) Patent No.: US 10,017,219 B2
(45) Date of Patent: Jul. 10, 2018

(54) PLATFORM TRUCK APPARATUS, WORKPIECE TRANSFER METHOD, AND WORKPIECE CONVEYOR EQUIPMENT

(71) Applicant: HONDA MOTOR CO., LTD., Tokyo (JP)

(72) Inventors: Nobuhiro Kozasa, Tochigi-ken (JP); Hidetoshi Takahashi, Tochigi-ken (JP); Katsuyoshi Tsutsumida, Tochigi-ken (JP); Katsutoshi Ebana, Tochigi-ken (JP); Tomonori Iwasaki, Tochigi-ken (JP); Gentoku Fujii, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/112,380

(22) PCT Filed: Oct. 28, 2014

(86) PCT No.: PCT/JP2014/078602
§ 371 (c)(1),
(2) Date: Aug. 22, 2016

(87) PCT Pub. No.: WO2015/111274
PCT Pub. Date: Jul. 30, 2015

(65) Prior Publication Data
US 2016/0355223 A1    Dec. 8, 2016

(30) Foreign Application Priority Data

Jan. 21, 2014   (JP) .................................. 2014-008399
Jan. 21, 2014   (JP) .................................. 2014-008420

(51) Int. Cl.
*B62D 65/18*     (2006.01)
*B65G 35/08*    (2006.01)

(52) U.S. Cl.
CPC .............. *B62D 65/18* (2013.01); *B65G 35/08* (2013.01); *B23P 2700/50* (2013.01); *B65G 2201/0294* (2013.01)

(58) Field of Classification Search
CPC ........ B62D 65/18; B62D 33/00; B65G 35/08; B65G 2201/0294; B23P 2700/50
(Continued)

(56) References Cited

U.S. PATENT DOCUMENTS 6,866,463 B2 * 3/2005 Riordan .................... B62B 3/04
                                                                    280/79.3
8,567,169 B2 * 10/2013 Spaniol ................ A01D 85/005
                                                                    414/111
(Continued)

FOREIGN PATENT DOCUMENTS

WO          2013/042511        3/2013
WO     WO 2013/168706      * 11/2013    .............. B23P 21/00

OTHER PUBLICATIONS

International Search Report, dated Feb. 3, 2015 (Feb. 3, 2015).

*Primary Examiner* — Anna M Momper
*Assistant Examiner* — Lynn E Schwenning
(74) *Attorney, Agent, or Firm* — Rankin, Hill & Clark LLP

(57) ABSTRACT

The platform truck apparatus is provided with: a narrow platform truck for transporting a car body; a left sub-platform truck, which is attached along the left side of the narrow platform truck and is pulled by the narrow platform truck; a left parts shelf carried on the left sub-platform truck; a right sub-platform truck, which is attached along the right side of the narrow platform truck and is pulled by the narrow platform truck; and a right parts shelf carried on the right sub-platform truck. Because the left sub-platform truck is moved backward relative to the narrow platform truck when (Continued)

a car body is loaded onto the narrow platform truck, the left parts shelf does not interfere with the loading of the car body.

4 Claims, 19 Drawing Sheets

(58) Field of Classification Search
USPC .............. 414/800; 280/810; 198/346, 346.1, 198/346.2, 347.1
See application file for complete search history.

(56) References Cited

U.S. PATENT DOCUMENTS

| | | | |
|---|---|---|---|
| 9,586,297 B2* | 3/2017 | Kozasa | B65G 37/00 |
| 2008/0276827 A1* | 11/2008 | Roeckle | B62D 65/18 |
| | | | 105/238.1 |
| 2014/0353116 A1 | 12/2014 | Kozasa et al. | |

* cited by examiner

PLATFORM TRUCK APPARATUS, WORKPIECE TRANSFER METHOD, AND WORKPIECE CONVEYOR EQUIPMENT

TECHNICAL FIELD

The present invention relates to a method of transferring a workpiece, typically, a vehicle body, an apparatus for transporting the workpiece, and a cart apparatus for use of the workpiece transfer method and the workpiece transportation apparatus (platform truck apparatus, workpiece transfer method, and workpiece conveyor equipment).

BACKGROUND ART

In production lines of vehicles, vehicle bodies are transported using carts, and parts are assembled to the vehicle bodies which are being transported, manually or using machines. A method of transporting a vehicle body for this purpose is known, e.g., in Patent Document 1.

FIG. 19 shows a vehicle production line disclosed in Patent Document 1. Referring to FIG. 19, a plurality of carts 202 are provided in a closed first transportation path 201. A vehicle body 203 is placed on each of the carts 202.

In the drawing, at a point P1, serving carts 204, 205 for supplying (distributing) parts are coupled to front and rear portions of the cart 202. Parts to be assembled to the vehicle body 203 are placed on these serving carts 204, 205. During movement of the cart 202 from the point P1 to a point P2, the parts are assembled to the vehicle body 203. After the service carts 204, 205 become vacant, at the point P2, the service carts 204, 205 are removed from the cart 202.

At a point P3, the vehicle body 203 is picked up from the cart 202 using a workpiece transfer apparatus 216 such as a lifting apparatus. After the cart 202 becomes vacant, the cart 202 moves along the first transportation path 201 counter-clockwise in the drawing, and returns to the point P1. Some of the parts are partially assembled in the first transportation path 201, and the remaining parts are assembled in a second transportation path 211.

A plurality of carts 212 are provided also in the second transportation path 211. At a point P4, serving carts 214, 215 are coupled to front and rear portions of the cart 212. Then, at the point P4, the vehicle body 203 is placed on the cart 212 by the workpiece transfer apparatus 216. During movement from the point P4 to a point P5, parts (remaining parts) are assembled to the vehicle body 203.

That is, the parts from the serving cart 214 are assembled to the front portion of the vehicle body 203, and the parts from the serving cart 215 are assembled to the rear portion of the vehicle body 203. Since the center of the vehicle body 203 is far from the serving carts 214, 215, the flow line of the operator becomes long. Therefore, while there is a need to improve the productivity, in the case of assembling parts at the center of the vehicle body 203, it is desirable to shorten the flow line of the operator.

Further, each of the carts 202, 212 is equipped with a drive source, and can travel by itself using the own drive source. At the point P3, in the state where the cart 202 is stopped, the vehicle body 203 is picked up therefrom. At the point P4, in the state where the cart 212 is stopped, the vehicle body 203 is placed on the cart 212. In the meanwhile, the other carts 202, 212 move at low speed. In order to avoid collisions between the carts 202, 212, a certain interval needs to be kept between the adjacent carts 202, and likewise, a certain interval needs to be kept between the adjacent carts 212.

For this purpose, in order to improve the productivity for certain lengths of the transportation paths 201, 211, it is desirable to position the carts 202, 212 more densely.

PRIOR ART REFERENCE

Patent Document

Patent Document 1:
International Publication WO2013/042511

SUMMARY OF INVENTION

Problems to be Solved by the Invention

An object of the present invention is to provide a cart apparatus, a workpiece transfer method, and a workpiece transportation apparatus in which, in the case of assembling parts at the center of a workpiece such as a vehicle body, it is possible to shorten the flow line of an operator, and it is possible to densely position carts in a transportation path.

In the invention described in claim 1, a cart apparatus for transporting a workpiece is provided. The cart apparatus includes a cart configured to travel on a closed transportation path, for transporting the workpiece placed on the cart, a left sub-cart provided along a left side of the cart, and towed by the cart, a left parts shelf placed on the left sub-cart, a right sub-cart provided along a right side of the cart, and towed by the cart, and a right parts shelf placed on the right sub-cart. The left parts shelf is transferred from outside of the closed transportation path to the left sub-cart, and the right parts shelf is transferred from the outside of the closed transportation path to the right sub-cart.

In claim 2, preferably, at least one of the left sub-cart and the right sub-cart is attached to the cart movably in a travel direction.

In claim 3, preferably, each of the left parts shelf and the right parts shelf has a caster, upper surfaces of the left sub-cart and right sub-cart are at same level with an upper surface of the cart, and the cart includes a guide rail configured to guide the left parts shelf when the left parts shelf moves toward the right sub-cart or guide the right parts shelf when the right parts shelf moves toward the left sub-cart.

In the invention described in claim 4, a method of transferring a workpiece by loading the workpiece on or unloading the workpiece from a cart configured to travel on a closed transportation path is provided. The method includes the step of using a cart apparatus including the cart, a left sub-cart provided along a left side of the cart and towed by the cart, a left parts shelf placed on the left sub-cart, a right sub-cart provided along a right side of the cart and towed by the cart, a right parts shelf placed on the right sub-cart. The left sub-cart is attached to the cart movably in a travel direction. Further, the method further includes the step of, at time of transferring the workpiece, moving a sub-cart positioned outside the transportation path backward to load the workpiece on or unload the workpiece from the cart, from outside of the transportation path.

In claim 5, preferably, at the time of replacing a parts shelf positioned inside the transportation path, among the left parts shelf and the right parts shelf, the left sub-cart is positioned on a left side of the cart and the right sub-cart is positioned on a right side of the cart, and the parts shelf positioned inside the transportation path is moved to the sub-cart positioned outside the transportation path via the cart.

In the invention described in claim 6, a method of transporting a workpiece by a cart configured to move along a closed transportation path is provided. The cart is moved by a drive source positioned outside the cart. The transportation path includes a first low speed movement path, a first high speed movement path extending from the first low speed movement path and being configured to move the cart at high speed in comparison with the first low speed movement path, a second low speed movement path extending from the first high speed movement path and being configured to move the cart at low speed in comparison with the first high speed movement path, and a second high speed movement path extending from the second low speed movement path to the first low speed movement path and being configured to move the cart at high speed in comparison with the second low speed movement path. A first workpiece transfer apparatus extends to the first high speed movement path and is configured to transfer the workpiece from outside of the transportation path to the cart, and a second workpiece transfer apparatus extends to the second high speed movement path and is configured to transfer the workpiece on the cart to the outside of the transportation path. The method includes the steps of, in the first low speed movement path, arranging a plurality of the carts in series to contact one another, and placing parts to be attached to the workpiece, on the cart, in the first high speed movement path, allowing one of the carts to travel at high speed, and stop at one intermediate position, for loading the workpiece on the cart by the first workpiece transfer apparatus, in the second low speed movement path, arranging a plurality of the carts in series to contact one another, and attaching the parts to the workpiece, and in the second high speed movement path, allowing one of the carts to travel at high speed, and stop at one intermediate position, for moving the workpiece on the cart to the outside of the transportation path, by the second workpiece transfer apparatus.

In the invention described in claim 7, a workpiece transportation apparatus for transporting a workpiece by a cart is provided. The workpiece transportation apparatus includes a drive source provided outside the cart and configured to move the cart, a transportation path, and a control unit configured to control the drive source. The transport path includes a first low speed movement path configured to allow the cart to move at low speed to perform operation of placing parts to be attached to the workpiece, on the cart, a first high speed movement path extending from the first low speed movement path and being configured to allow the cart to move at high speed in comparison with the first low speed movement path, a second low speed movement path extending from the first high speed movement path and keeping movement of the cart at low speed in comparison with the first high speed movement path to perform operation of attaching the parts to the workpiece, and a second high speed movement path extending from the second low speed movement path to the first low speed movement path and being configured to allow the cart to move at high speed in comparison with the second low speed movement path. The drive source is controlled by the control unit to: in the first low speed movement path and the second low speed movement path, arrange a plurality of the carts in series to contact one another, in the first high speed movement path, allow one of the carts to travel at high speed, and stop at one intermediate position, and in the second high speed movement path, allow one of the carts to travel at high speed, and stop at one intermediate position.

Advantages of the Invention

In the invention according to claim 1, the workpiece is placed on the cart. The left parts shelf is provided along the left side of the cart, and the right parts shelf is provided along the right side of the cart. Since the distance from the center of the workpiece to the left parts shelf and the right parts shelf becomes short, it is possible to shorten the flow line of the operator. Further, parts are supplied only from the outside of the transportation path. Since it is not necessary for the operator to enter the inside of the closed transportation path, it becomes possible to supply and/or distribute the parts very easily, and further improvement in the operating efficiency is achieved.

In claim 1, in the case where a tall parts shelf is provided on a side of the cart, it is necessary to lift the workpiece to a high position to avoid contact between the workpiece and the parts shelf when the workpiece is transferred from the cart. In such a situation, it takes considerable time for the transfer operation, and the productivity may be adversely affected. Thus, in the invention according to claim 2, the parts shelf can be retracted at the time of the transfer operation. As a result, it becomes possible to perform the transfer operation without significantly lifting the workpiece. Therefore, the time required for the transfer is reduced, and hence, it is possible to improve the productivity.

In the invention according to claim 3, it is possible to easily move the parts shelf positioned inside the closed transportation path to the outside of the transportation path via the cart. In the case where the parts shelf is positioned outside the transportation path, for example, replacement of the parts shelf can be performed easily, and improvement in the workability is achieved.

In the invention according to claim 4, the parts shelf can be retracted at the time of the transfer operation. As a result, it becomes possible to perform the transfer operation without significantly lifting the workpiece. Therefore, the time required for the transfer is reduced, and hence, it is possible to improve the productivity.

In the invention according to claim 5, it is possible to easily move the parts shelf positioned inside the closed transportation path to the outside of the transportation path via the cart. In the case where the parts shelf is positioned outside the transportation path, for example, replacement of the parts shelf can be performed easily, and improvement in the workability is achieved.

In the invention according to claim 6, the cart is stopped in the first high speed movement path, and the workpiece is loaded on this cart from the outside, the cart is stopped in the second high speed movement path, and the workpiece is moved to the outside from this cart. In the first and second low speed movement paths, the carts move forward continuously without any stop. Therefore, the carts can be positioned in series densely in the first and second low speed movement paths.

In the invention according to claim 7, the first low speed movement path, the first high speed movement path, the second low speed movement path, and the second high speed movement path form the closed transportation path. In the first low speed movement path, the parts are placed on the cart, in the first high speed movement path, the workpiece is placed on the cart, in the second low speed movement path, the parts are assembled to the workpiece, and in the second high speed movement path, the workpiece is taken out from the cart. In the first and second low speed movement paths, the carts move forward continuously without any stop. Therefore, the carts can be positioned in series densely in the first and second low speed movement paths.

DESCRIPTION OF EMBODIMENTS

Figure 1:
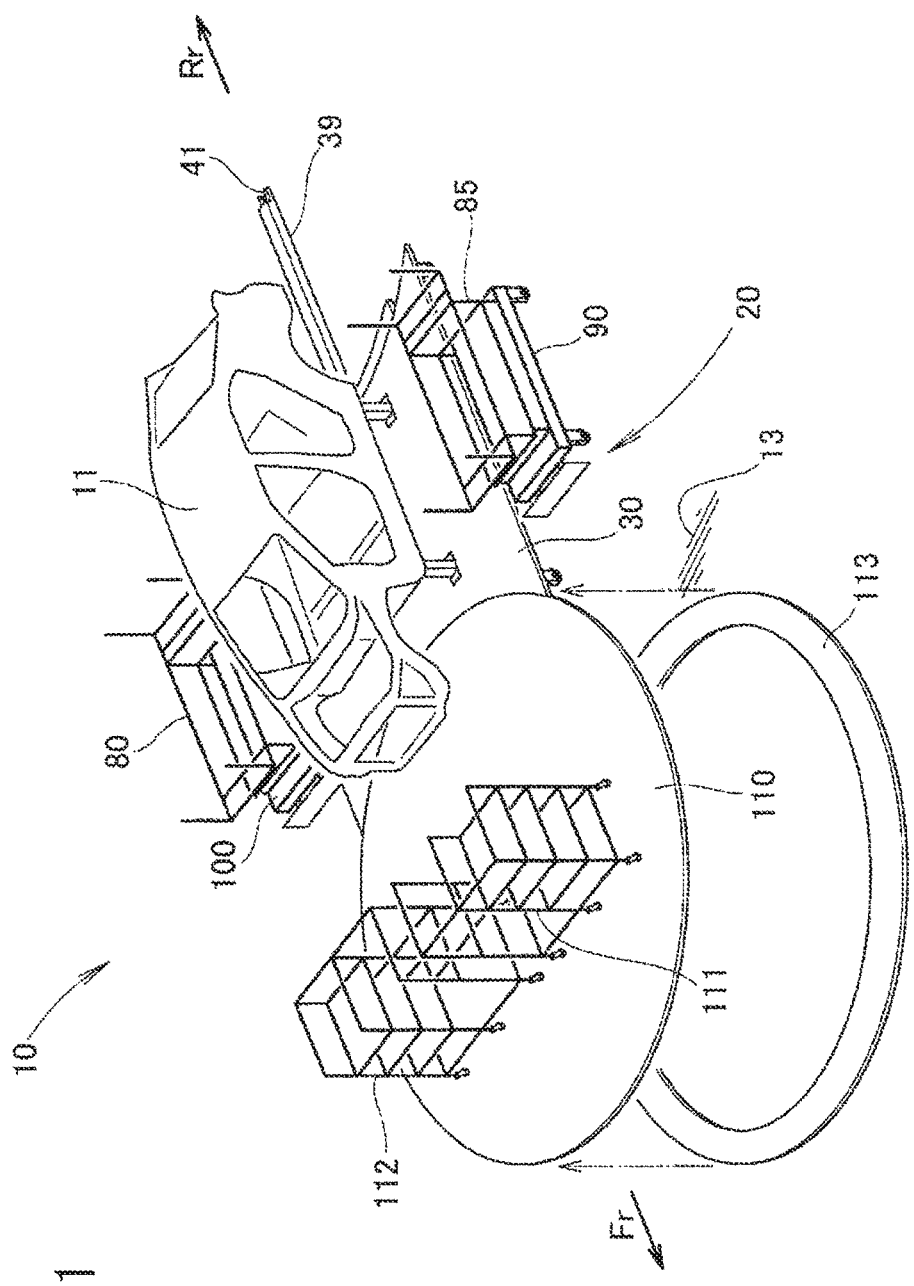
FIG. 1 is a perspective view of a cart including a cart apparatus according to the present invention.

Hereinafter preferred embodiments of the present invention will be described with reference to the accompanying drawings. In the drawings, "Fr" stands for "Front", and "Rr" stands for "Rear".

EMBODIMENTS

Referring to FIGS. 1 to 4, a cart 10 includes a cart apparatus 20 and a circular cart 110 provided on a front side of the cart apparatus 20. A first parts shelf 111 and a second parts shelf 112 are placed on the circular cart 110.

The cart apparatus 20 includes a constricted cart 30, a left sub-cart 90, a third parts shelf (left parts shelf) 85, a right sub-cart 100, and a fourth parts shelf (right parts shelf) 80. The constricted cart 30 transports a vehicle body 11 as a workpiece, and the central portion of the constricted cart 30 is constricted in a curved shape. The left sub-cart 90 is provided along the left side of the constricted cart 30, and towed by the constricted cart 30. The third parts shelf 85 is placed on the left sub-cart 90. The right sub-cart 100 is provided along the right side of the constricted cart 30, and towed by the constricted cart 30. The fourth parts shelf 80 is placed on the right sub cart 100. The left and right sub-carts 90, 100 are attached to the left and right sides of the constricted cart 30, respectively. The upper surfaces of the left and right sub-carts 90, 100 and the upper surface of the constricted cart 30 are at the same level (height). A reinforcement ring plate 113 is provided on a lower surface of a table of the circular cart 110.

Figure 4:
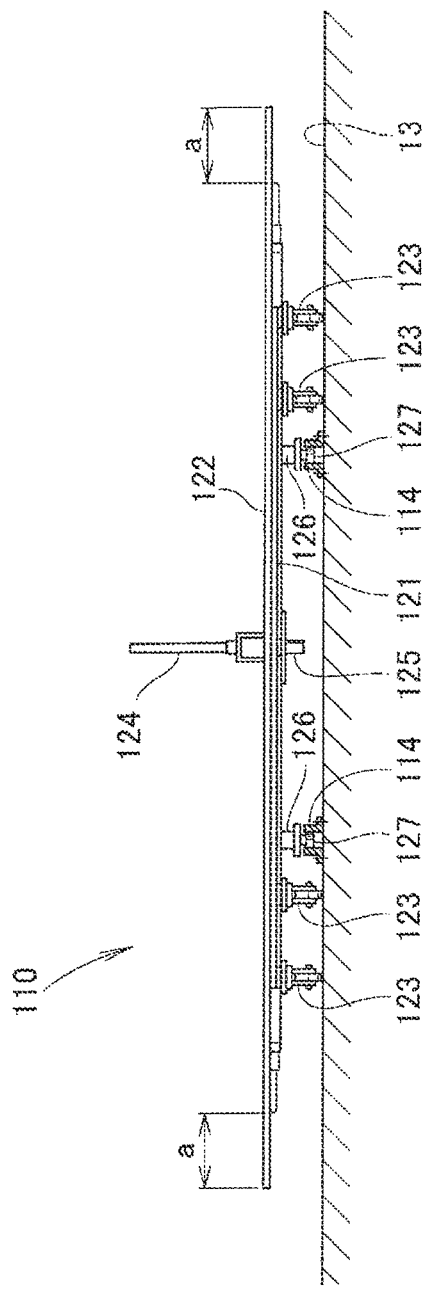
FIG. 4 is a view shown in a direction indicated by an arrow 4 in FIG. 3.

As shown in FIG. 4, the circular cart 110 includes a framework 121 formed by combining steel members, and a plurality of free wheels 123. The circular cart 110 is a vehicle which can freely travel on a factory floor 13. The circular cart 110 includes a post 124 and a center pin 125 at its central position. The post 124 protrudes upward, and the center pin 125 extends downward. A plurality of brackets 126 protrude downward from the framework 121. Each of the brackets 126 has a free roll 127 which rotates horizontally. A plurality of rails 114 in the form of grooves are provided on the upper surface of the factory floor 13. The free rolls 127 are guided by the rails 114 for allowing the circular cart 110 to travel in a direction toward the backside, or toward the front side of the drawing sheet of FIG. 4. It should be noted that, since the circular cart 110 is not equipped with any drive source, the circular cart 110 cannot travel by itself.

Though a wooden floor 122 of the circular cart 110 is reinforced by the reinforcement ring plate 113 (see FIG. 1), the wooden floor 122 is overhung by a distance "a".

Figure 5:
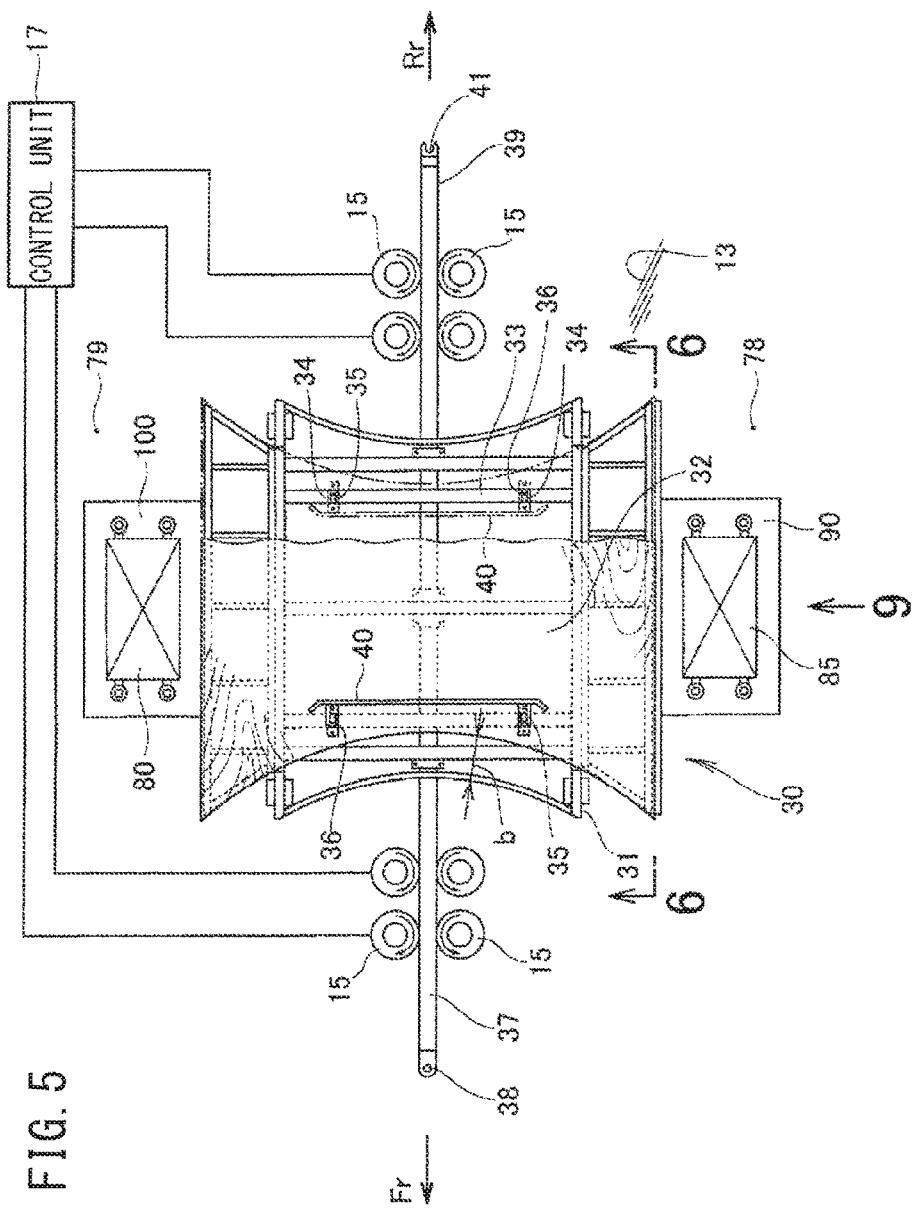
FIG. 5 is a plan view of a constricted cart shown in FIG. 2.
Figure 6:
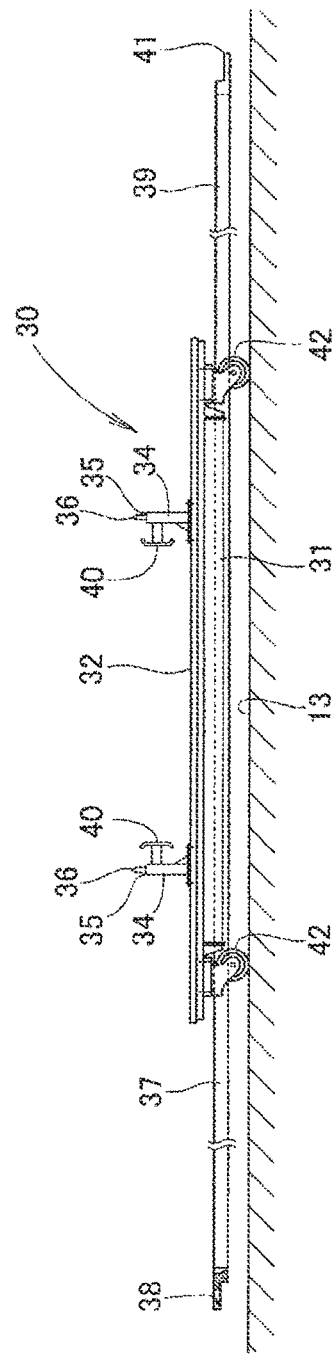
FIG. 6 is a view shown in a direction of a line 6-6 in FIG. 5.

As shown in FIGS. 5 and 6, the constricted cart 30 includes a framework 31 formed by combining steel members and a wooden floor 32 attached to the upper surface of the framework 31. The framework 31 includes a cross member 33. Columns 34 are provided to stand upright using this cross member 33. Receivers 35 for receiving the vehicle body and positioning pins 36 for horizontally positioning the vehicle body are provided at these columns 34. Guide rails 40 are provided between the columns 34. The guide rails 40 protrude toward each other.

A front pole 37 extends forward from the framework 31. A hole 38 is provided at the front end of the front pole 37, and the center pin 125 (FIG. 4) extending downward from the central position of the circular cart 110 is fitted into this hole 38. Further, a rear pole 39 extends backward from the framework 31. A bifurcated portion 41 is provided at the rear end of this rear pole 39, and the center pin 125 is fitted to the bifurcated portion 41. At the time of forward movement (Fr), the center pin 125 pushes the bifurcated portion 41. Further, when the forward movement speed of the bifurcated portion 41 is larger than the forward movement speed of the center pin 125, the bifurcated portion 41 is removed from the center pin 125.

Pinch rolls 15 as drive sources are provided on the factory floor 13. The pinch rolls 15 are rotated by motors, etc., respectively. The front pole 37 and the rear pole 39 are sandwiched between the pinch rolls 15, and forward movement of the constricted cart 30 is actuated to move the constricted cart 30. When the pinch rolls 15 are stopped, movement of the constricted cart 30 is stopped. The low speed positive rotation, stop, and high speed positive rotation of the pinch rolls 15 are controlled altogether by a control unit 17.

The front pole 37 extends to the center of circular cart positioned on the front side, and the rear pole 39 extends to the center of the circular cart positioned on the backside. Therefore, both of the front pole 37 and the rear pole 39 are elongated members. Since the front pole 37 and the rear pole 39 are elongated members, the front pinch rolls 15 and the rear pinch rolls 15 can be positioned remotely, and it is possible to reduce the number of drive sources.

As shown in FIG. 6, a plurality of free wheels 42 are attached to the framework 31 for allowing the constricted cart 30 to travel on the factory floor 13. As shown in FIG. 5, the framework 31 extends from the wooden floor 32 in the forward and backward travel directions of the constricted cart 30 by the distance "b".

Figure 2:
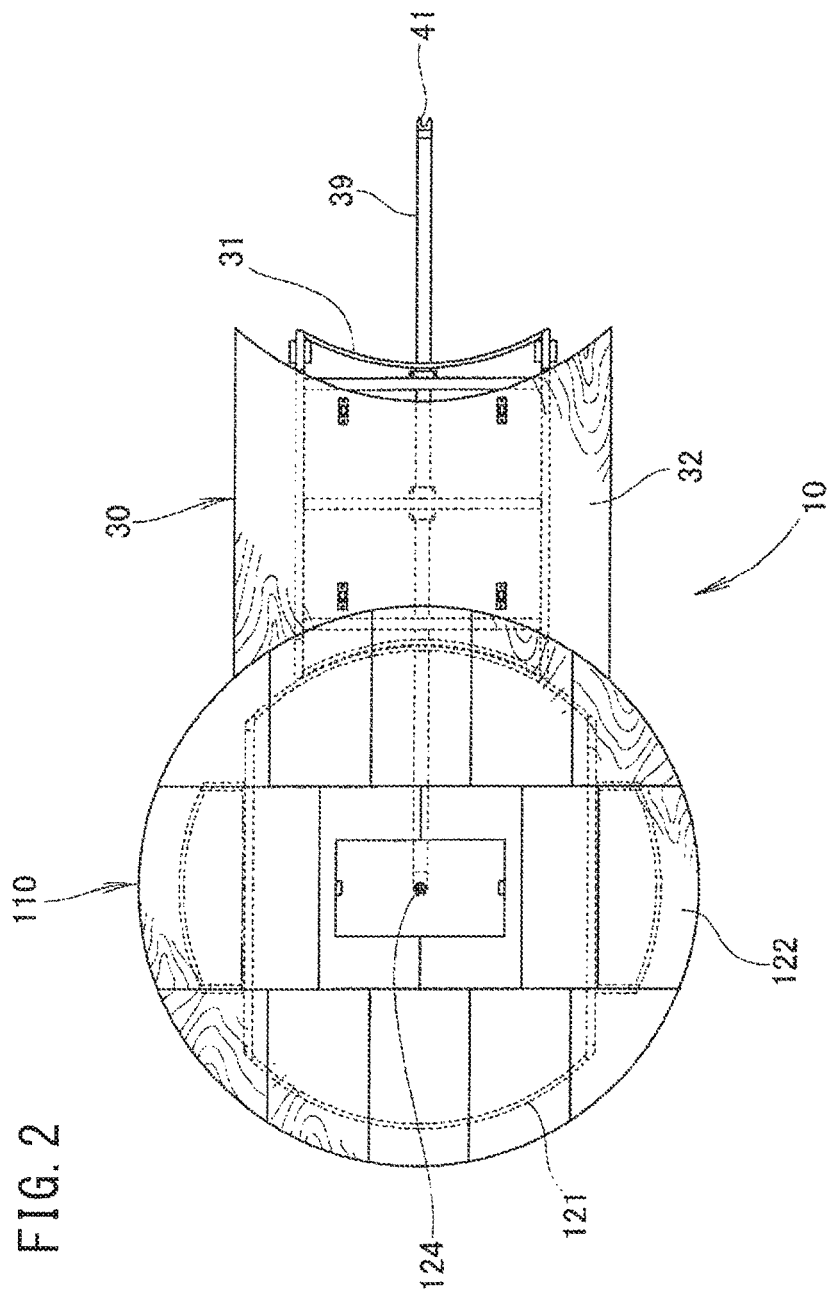
FIG. 2 is a plan view of the cart shown in FIG. 1.
Figure 3:
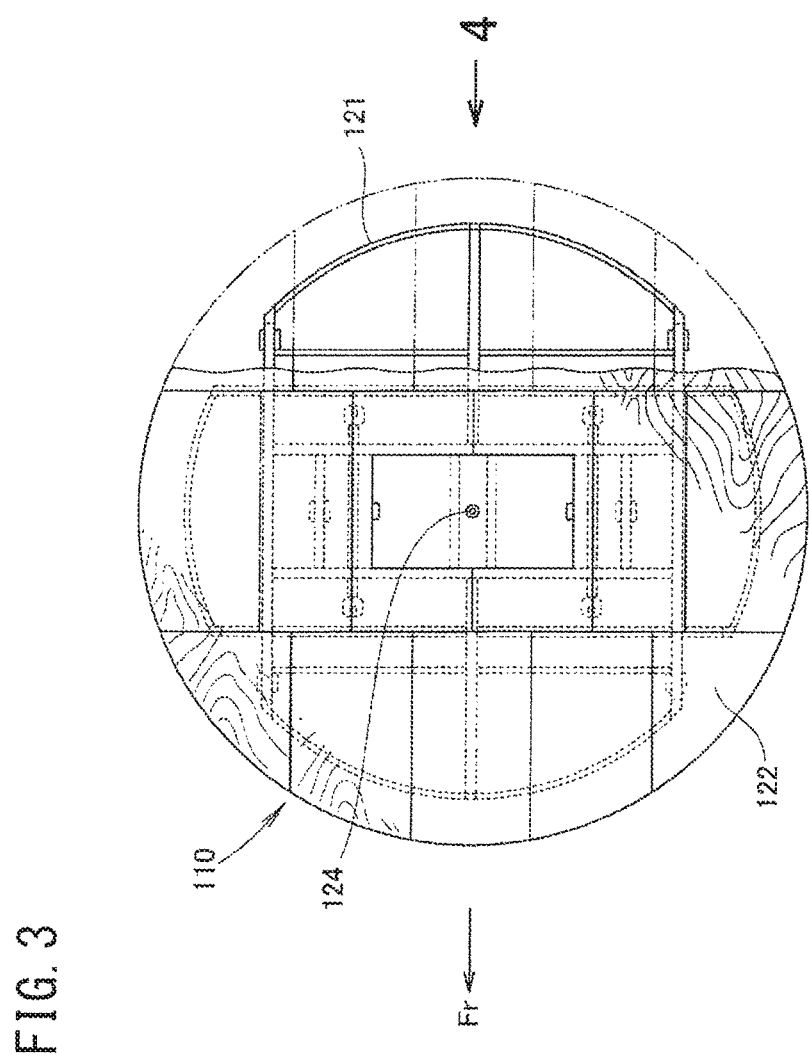
FIG. 3 is a plan view of a circular cart shown in FIG. 2.

As shown in FIG. 2, the center pin 125 shown in FIG. 4 is fitted in the hole 38 formed at the front end of the front pole 37. Thus, the cart 10 takes its final form shown in FIG. 2. In the normal state, the circular cart 110 is not removed from the constricted cart 30.

Next, a specific example of the above workpiece transportation apparatus using the cart 10 including the constricted cart 30 will be described.

Figure 7:
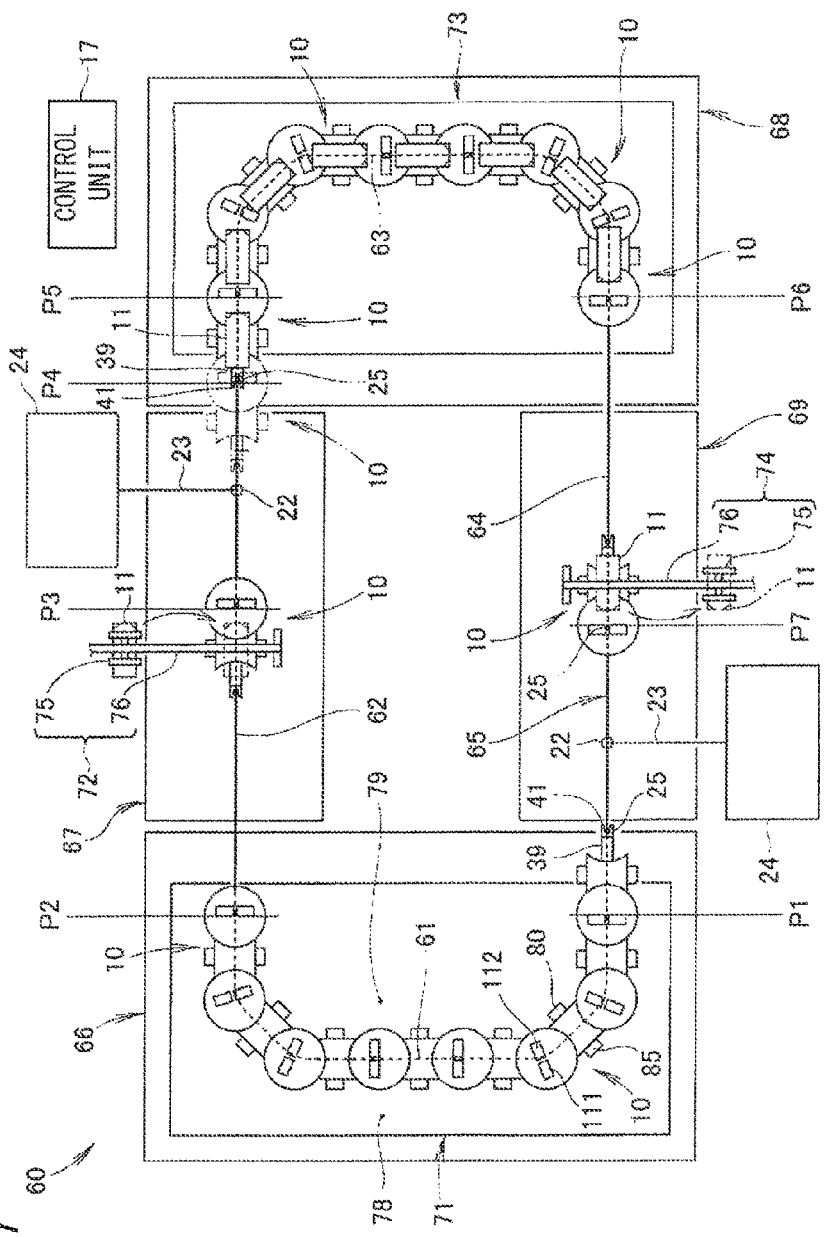
FIG. 7 is a diagram showing a closed transportation channel.

As shown in FIG. 7, a workpiece transportation apparatus 60 includes drive sources (e.g., pinch rolls 15 shown in FIG. 5), a closed transportation path 65, and the control unit 17. The drive sources are positioned outside the carts 10, and move the carts 10. The closed transportation path 65 includes a first low speed movement path 61, a first high speed movement path 62, a second low speed movement path 63, and a second high speed movement path 64. In the first low speed movement path 61, the carts 10 move at low speed for placing parts to be attached to a workpiece (e.g., vehicle body 11 shown in FIG. 1), on the carts 10. The first high speed movement path 62 extends from the first low speed movement path 61. In the first high speed movement path 62, the carts 10 move at high speed in comparison with the first low speed movement path 61. The second low speed movement path 63 extends from this first high speed movement path 62. In the second low speed movement path 63, the carts 10 keep their movement at low speed in comparison with the first high speed movement path 62 for attaching the parts to the workpiece. The second high speed movement path 64 extends from the second low speed movement path 63 to the first low speed movement path 61. In the second high speed movement path 64, the carts 10 move at high speed in comparison with the second low speed movement path 63.

In the drawing, reference numerals 22 denote joint portions provided in the first high speed movement path 62 and/or the second high speed movement path 64. Extension paths 23 extend from the joint portions 22 to the outside of the transportation path 65, up to cart buffers 24 where spare carts 10 are present. Therefore, in the event that a failure occurs in any of the carts 10, the cart 10 having the failure is guided from the joint portion 22 to the extension path 23, and the cart 10 is retreated (turned out) to the cart buffer 24. In return, a spare cart 10 is sent back from the cart buffer 24 to the transportation path 65. By providing the joint portion 22, the cart 10 having the failure can be replaced with the spare cart 10 efficiently.

In terms of speed range, the workpiece transportation apparatus 60 is divided into a first low speed area 66 chiefly made up of the first low speed movement path 61, a first high speed area 67 chiefly made up of the first high speed movement path 62, a second low speed area 68 chiefly made up of the second low speed movement path 63, and a second high speed area 69 chiefly made up of the second high speed movement path 64.

Further, the first low speed area 66 includes a parts supply area 71. In the first high speed area 67, a first workpiece transfer apparatus 72 extends from the outside, and a front end of the first workpiece transfer apparatus 72 is overlapped with the first high speed movement path 62 in a plan view. The second low speed area 68 includes a work area 73 for assembling parts. In the second high speed area 69, a second workpiece transfer apparatus 74 extends from the outside, and a front end of the second workpiece transfer apparatus 74 is overlapped with the second high speed movement path 64 in a plan view.

Each of the first workpiece transfer apparatus 72 and the second workpiece transfer apparatus 74 includes a lift hanger 75 for catching the vehicle body 11 to move it up/down, and a ceiling rail 76 for guiding the lift hanger 75 in a direction perpendicular to the first high speed movement path 62 or the second high speed movement path 64.

Under the control of the control unit 17, in the first low speed movement path 61 and the second low speed movement path 63, a plurality of carts 10 are arranged in series to contact one another, in the first high speed movement path 62, one cart 10 travels at high speed, and the cart 10 is stopped at one intermediate position (position overlapped with the first workpiece transfer apparatus 72), and in the second high speed movement path 64, one cart 10 travels at high speed, and the cart 10 is stopped at one intermediate position (position overlapped with the second workpiece transfer apparatus 74). The travel direction of the cart 10 is determined by the circular cart 110 shown in FIG. 3. The following constricted cart 30 follows the circular cart 110. Therefore, the cart 10 is guided along the rails 114 (see FIG. 4) to make turns, or move straight.

Movement of the cart 10 will be described again using notations P1 to P7 shown in FIG. 7.

A group of carts 10 moves at low speed between the points P1 and P2. The carts 10 are coupled in series densely between the points P1 and P2. While the carts 10 move at low speed from the point P1 to the point P2, parts are supplied to the first to fourth parts shelves 85, 80, 111, and 112. Instead of placing the parts on the first to fourth parts shelves 85, 80, 111, and 112, the parts may be supplied to the carts 10 by replacing the parts shelves 80, 85, 111, and 112 with other parts shelves.

At the point P2, only the speed of the leading cart 10 is switched from the low speed to the high speed. In this manner, only one cart 10 arrives at the point P3 in a short period of time, and the cart 10 is stopped at the point P3. The first workpiece transfer apparatus 72 loads the vehicle body 11 on the cart 10. Next, the cart 10 moves to the point P4 at high speed. Since the preceding cart 10 at the point P4 moves at low speed, as shown by an imaginary line, the next following cart 10 catches up with this preceding cart 10. Then, a center pin 25 of the next following cart 10 is fitted into the bifurcated portion 41 of the rear pole 39 of the preceding cart 10. Thereafter, the carts 10 move together at low speed. Consequently, a plurality of the carts 10 are coupled together, and arranged densely between the point P5 and the point P6. In the work area 73, parts are assembled to the vehicle body 11.

It should be noted that, in the work area 73, so called cell production is performed. The "cell production" herein means a production system where parts shelves are provided around the workpiece. In this state, assembling operation is performed from the start to the end. However, normal production may be performed in the work area 73. The "normal production" herein means a production system where parts are picked up from parts shelves placed on the floor, and assembled to a workpiece which is being transported.

In FIG. 7, though the second low speed movement path 63 in the work area 73 has a U-shape, for the purpose of increasing the length of the transportation path, the second low speed movement path 63 may have a W shape, or may have more serpentine curves. Likewise, though the illustrated first low speed movement path 61 in the parts supply area 71 has a U-shape, for the purpose of increasing the length of the transportation path, the first low speed movement path 61 may have a W shape, or may have a larger number of serpentine curves. That is, the length of the transportation path of the second low speed movement path 63 should be determined based on the number of operation steps, and the length of the transportation path of the first low speed movement path 61 should be determined based on the number of assembling parts.

Further, in the work area 73, an operator rides on the circular cart 110 shown in FIG. 1, and assembles parts on the first parts shelf 111 to the front portion of the vehicle body 11. Parts stored on the second parts shelf 112 are assembled to the rear portion of a preceding vehicle body. The operator rides on the constricted cart 30, and assembles parts on the third parts shelf 85 to the left side of the vehicle body 11, and assembles parts on the fourth parts shelf 80 to the right side of the vehicle body 11.

The walking surface of the circular cart 110 and the walking surface of the constricted cart 30 are wooden floor surfaces. The wooden floor has a significantly large frictional resistance coefficient in comparison with the normal steel floor. Therefore, if the wooden floor surface is adopted, even in the case where oil or grease is adhered to the floor surface, the operator does not slip easily.

At or before the point P6 in FIG. 7, operation of assembling parts to the vehicle body has been finished. Therefore, at the point P6, the speed of only the preceding cart 10 is switched from low speed to high speed. Then, only one cart 10 arrives at the point P7 in a short period of time, and the cart 10 is stopped at the point P7. By the second workpiece transfer apparatus 74, the vehicle body 11 is picked up from the preceding cart 10. Then, the preceding vacant cart 10 moves to the point P1 at high speed. At the point P1, since the preceding cart 10 travels at low speed, the following cart 10 catches up with this preceding cart 10. Then, the center pin 25 of the next following cart 10 is fitted into the bifurcated portion 41 of the rear pole 39 of the preceding cart 10. Thereafter, the carts 10 move together at low speed. Consequently, a plurality of the carts 10 are coupled together, and arranged densely between the point P1 and the point P2. Parts are supplied to the carts 10 in the parts supply area 71.

In FIG. 7, for the sake of simplicity, the illustrated work area 73 is a relative small area. However, the work area 73 may be a large area, e.g., in the case where a large number of parts are present. In such a case, by configuring the second low speed movement path 63 to have a serpentine pattern, it is possible to suppress increase in the size of the work area 73.

A large number of carts 10 are arranged densely in the second low speed movement path 63. The same applies to the first low speed movement path 61. Consequently, in comparison with the conventional technique where the carts are spaced from one another, in the embodiment of the present invention, a larger number of carts 10 can be positioned in the work area 73 and the parts supply area 71. Therefore, significant improvement in the productivity per unit area of the working floor is achieved.

In the embodiment of the present invention, the cart 10 includes the circular cart 110 and the constricted cart 30. However, the cart 10 may be simply a normal cart without having this structure. Instead of the pinch roll, a dog chain, a chain with an attachment may be used. The type and form of the drive source can be determined arbitrarily. Further, the workpiece may not be the vehicle body as long as the workpiece is a casing before assembling of parts to the workpiece. The workpiece may be of any type, or may have any structure. However, it should be noted that the present invention is suitably applicable to vehicle production lines where improvement in the efficiency of producing the workpiece is strongly desired.

On outside 78 of the closed transportation path 65, the operator can freely approach the cart 10. Since no over-bridges bridging over the transportation path 65 are provided, and no tunnels passing under the transportation path 65 are provided, the operator cannot go inside 79 of the transportation path 65 freely. In FIG. 5, the left-sub cart 90 is positioned on the outside 78 of the transportation path 65, and the right-sub cart 100 is positioned on the inside 79 of the transportation path 65. There are some problems in operation of loading the fourth parts shelf (right parts shelf) 80 on the right sub-cart 100, and operation of unloading the fourth parts shelf (right parts shelf) 80 from the right sub-cart 100. The present invention is directed to provide solutions to address the problems. Hereinafter, the details of the solution will be described in detail.

Figure 8:
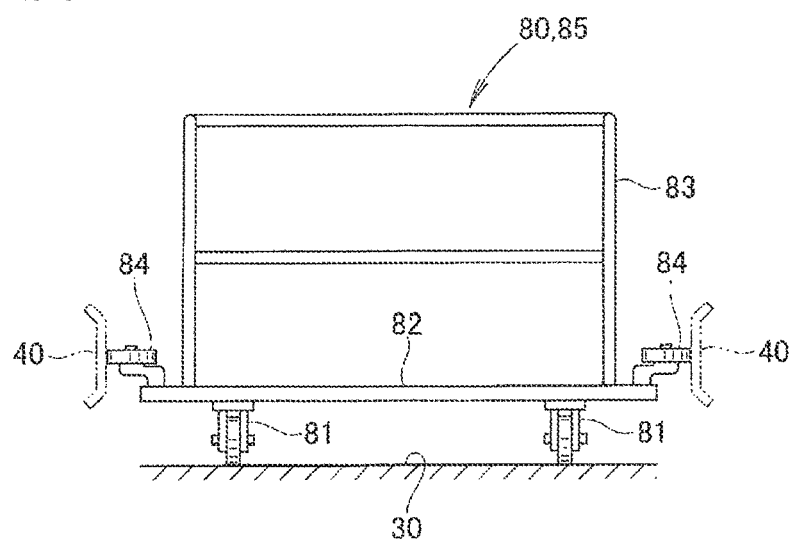
FIG. 8 is a view showing third and fourth parts shelves shown in FIG. 1.

As shown in FIG. 8, the fourth parts shelf (right parts shelf) 80 includes a frame plate 82 equipped with casters 81, a frame 83 provided upright on this frame plate 82, and free rolls 84 provided respectively at the left and right ends of the frame plate 82. The free rolls 84 contact the guide rails 40 indicated by imaginary lines, and the free rolls 84 rotate freely. Consequently, the fourth parts shelf 80 travels on the constricted cart 30 in a direction toward the backside, or toward the front side of the drawing sheet. The third parts shelf 85 may have the same structure as the fourth parts shelf 80. However, the free rolls 84 may be omitted.

Figure 9:
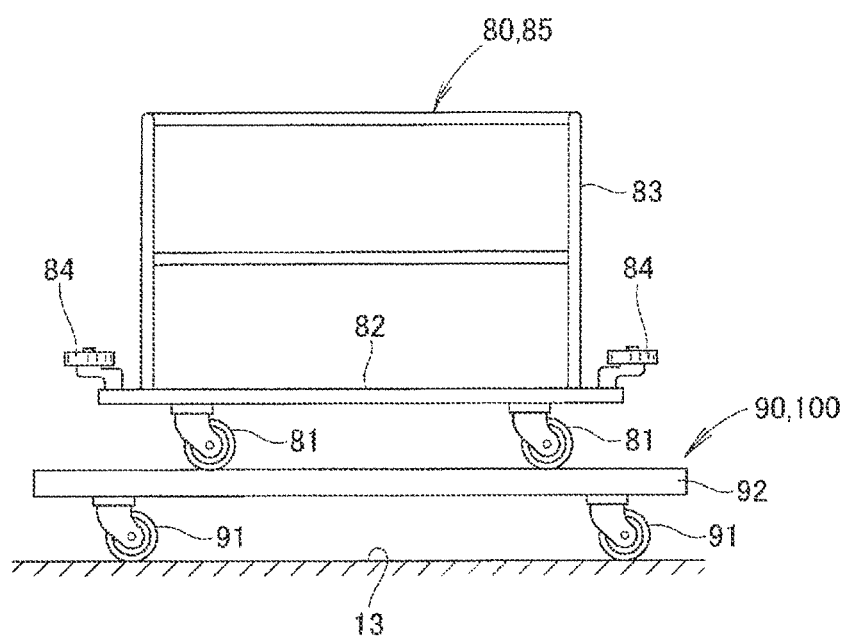
FIG. 9 is a view showing the third and fourth parts shelves shown in FIG. 5, viewed in a direction indicated by an arrow 9.

As shown in FIG. 9, the left sub-cart 90 is a cart having a frame plate 92 which is equipped with casters 91, and travels on the factory floor 13. The third and fourth parts shelves (left and right parts shelves) 85, 80 are placed on the frame plate 92. Since the right sub-cart 100 has the same structure as the left sub-cart 90, description of the structure is omitted.

Figure 10:
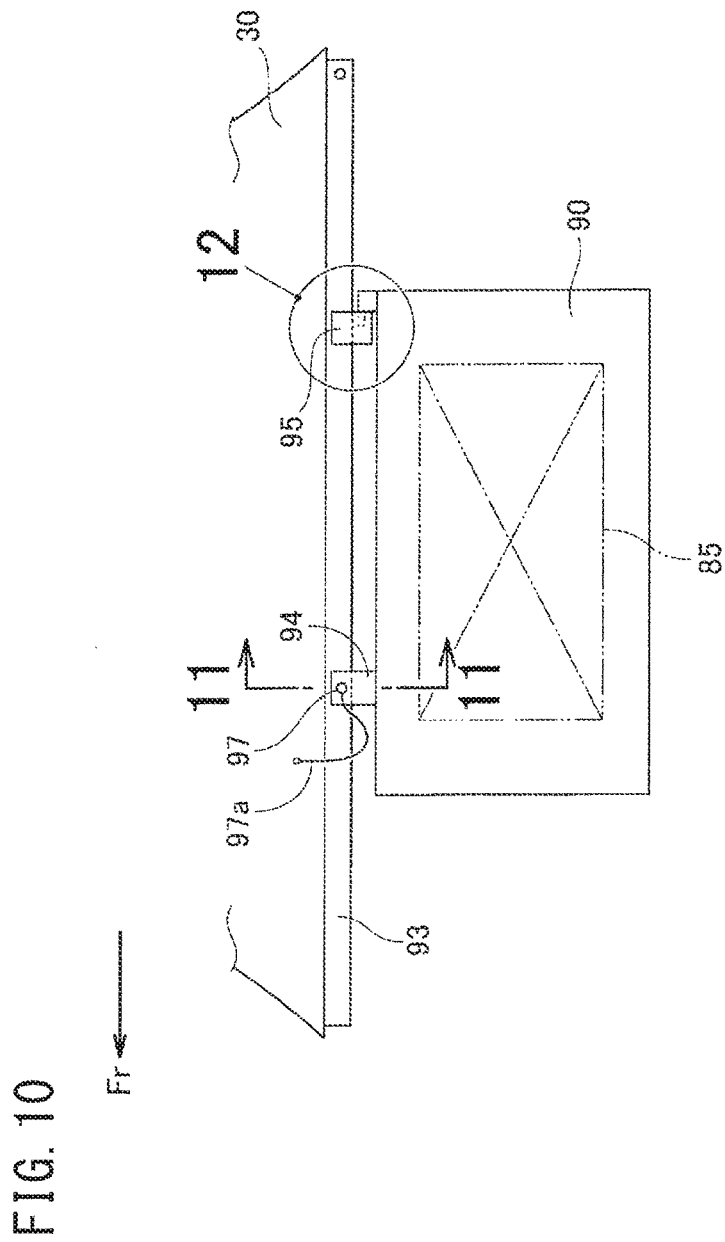
FIG. 10 is a view showing the relationship between the constricted cart and the third parts shelf.

As shown in FIG. 10, an elongated rail 93 is provided along the left side of the constricted cart 30. A front slider 94 and a rear slider 95 are movably fitted to this elongated rail 93. The left sub-cart 90 is fixedly coupled to the front slider 94.

Figure 11:
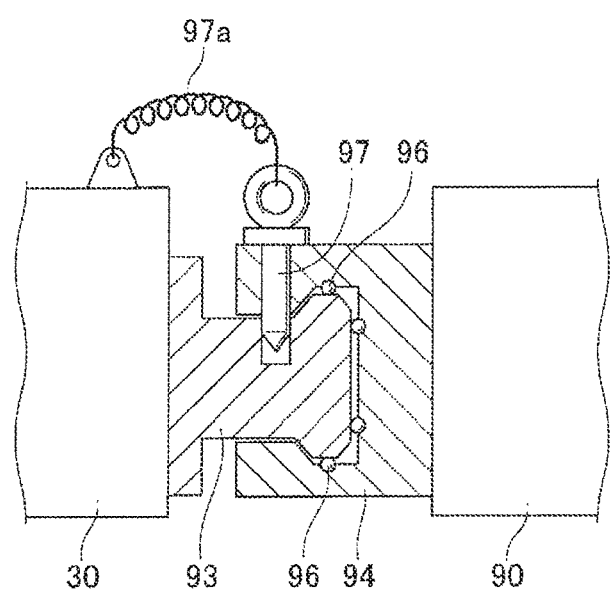
FIG. 11 is a view cut along a line 11-11 in FIG. 10.

As shown in FIG. 11, the front slider 94 is fitted to the elongated rail 93 through steel balls 96, and moves slightly in the direction toward the backside, or toward the front side of the drawing sheet. It should be noted that movement of the front slider 94 can be prevented by inserting a lock pin 97 into the front slider 94 and the elongated rail 93. The lock pin 97 is coupled to the constricted cart 30 using a chain 97a.

Figure 12:
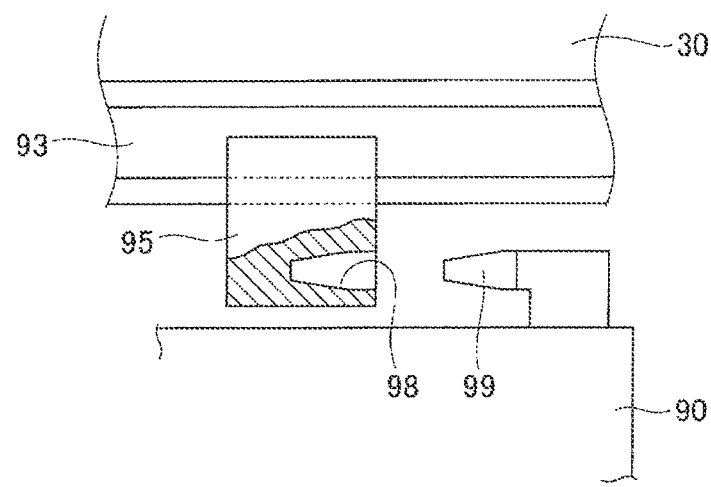
FIG. 12 is an enlarged view of a portion 12 in FIG. 10.

As shown in FIG. 12, the rear slider 95 is movably fitted to the elongated rail 93 as well. A fitting hole 98 is formed in the rear slider 95, and the left sub-cart 90 has a fitting pin 99. When the fitting pin 99 is fitted into the fitting hole 98, the left sub-cart 90 and the rear slider 95 are coupled together.

In the parts supply area 71 shown in FIG. 7, parts are supplied to the cart 10.

Figure 13:
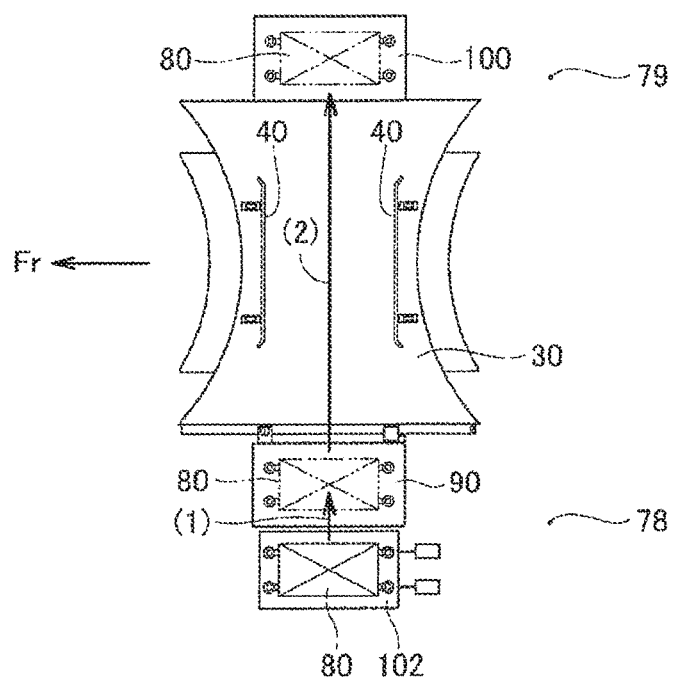
FIG. 13 is a view showing a procedure of loading a right parts shelf as the fourth parts shelf on a right sub-cart.

As shown in FIG. 13, the left sub-cart 90 is provided along the left side of the constricted cart 30, and the right sub-cart 100 is provided along the right side of the constricted cart 30, on both sides of the guide rails 40. In this state, the constricted cart 30 moves forward at low speed while towing the left and right sub-carts 90, 100.

In the parts supply area 71 (FIG. 7), the operator carries the fourth parts shelf (right parts shelf) 80 using a hand cart 102. This hand cart 102 is positioned next to the left sub-cart 90. In this state, as indicated by an arrow (1), the right parts shelf 80 is transferred from the hand cart 102 to the left sub-cart 90. Further, as indicated by an arrow (2), the right parts shelf 80 is guided by the guide rails 40 to move on the constricted cart 30, and the right parts shelf 80 is transferred to the right sub-cart 100. That is, the right parts shelf 80 is transferred to the right sub-cart 100 without requiring the operator to enter the inside 79 (FIG. 7).

Figure 14:
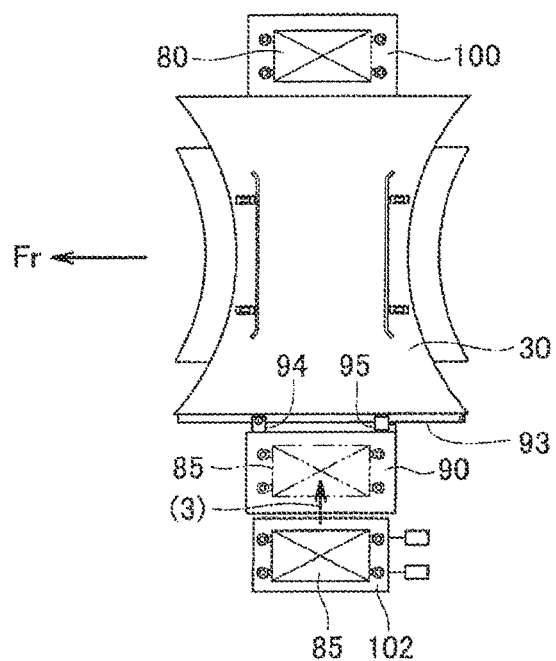
FIG. 14 is a view showing a procedure of loading a left parts shelf as the third shelve on a left sub-cart.

Then, as shown in FIG. 14, the operator transports the left parts shelf 85 using the hand cart 102. This hand cart 102 is positioned next to the left sub-cart 90. In this state, as indicated by an arrow (3), the left parts shelf 85 is transferred from the hand cart 102 to the left sub-cart 90. In this manner, the parts shelves 85, 80 are placed on the left and right sides of the constricted cart 30.

Since the hand cart 102 is no longer required, the hand cart 102 is returned to the stand-by position. The left sub-cart 90 is towed by the constricted cart 30 using the front slider 94 and the rear slider 95 through the elongated rail 93. As shown in FIG. 7, in the parts supply area 71, since the first low speed movement path 61 is curved, a centrifugal force is applied to the left sub-cart 90 in a direction away from the constricted cart 30. However, as shown in FIG. 14, since the left sub-cart 90 is coupled to the constricted cart 30 by the front and rear sliders 94, 95, the left sub-cart 90 makes turns without being detached from the constricted cart 30.

Figure 15A:
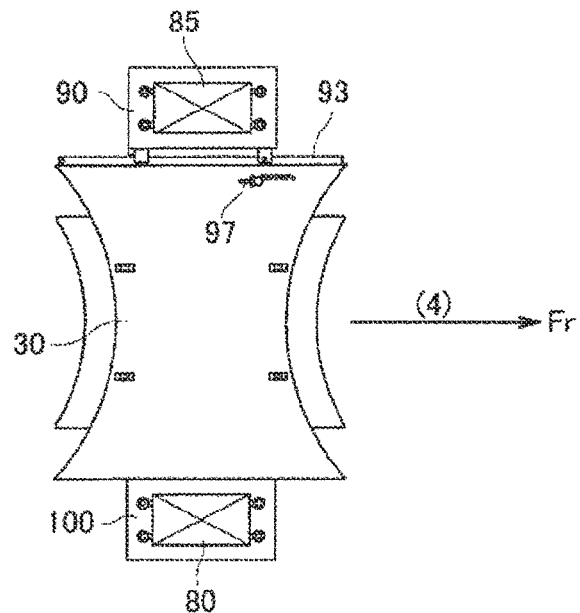
FIGS. 15A and 15B are views showing movement of the left-sub cart.
Figure 15B:
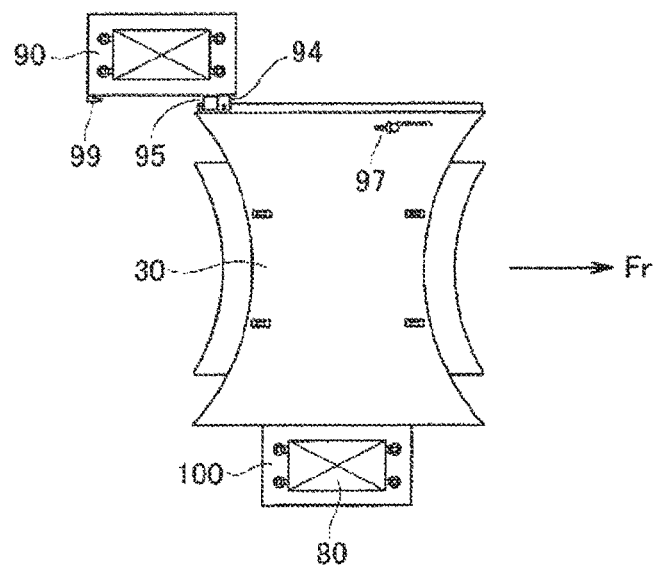

Referring to FIG. 7, in the first high speed area 67, the cart 10 moves at high speed along the straight first high speed movement path 62. As shown in FIG. 15A, the lock pin 97 is pulled out to allow movement of the left sub-cart 90. Then, as indicated by an arrow (4), the constricted cart 30 moves forward at high speed. Consequently, as shown in FIG. 15B, the left sub-cart 90 is left, and moves relatively to the rear end of the constricted cart 30. Specifically, the fitting pin 99 is detached from the rear slider 95, and the front slider 94 is retreated backward relatively to the backward retreat limit position. Consequently, the left side of the constricted cart 30 is almost opened.

Figure 16A:
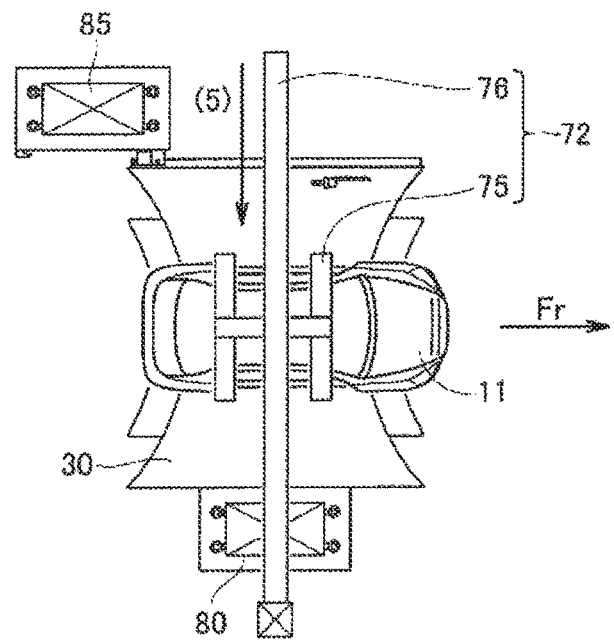
FIGS. 16A and 16B are views showing a step of moving a workpiece and returning of the left sub-cart.

As shown in FIG. 16A, by the lift hanger 75, the vehicle body 11 is carried into the constricted cart 30, as indicated by an arrow (5). As shown in FIG. 1, front and rear lower portions of the vehicle body 11 are cut away (free of parts). Therefore, in FIG. 16A, the vehicle body 11 does not interfere with the third parts shelf (left parts shelf) 85. Consequently, it is possible to carry the vehicle body 11 into the constricted cart 30 without significantly lifting the vehicle body 11. The level of the ceiling rail 76 can be lowered, and reduction of the lifting amount of the lift hanger 75 can be reduced. Accordingly, size reduction of the first workpiece transfer apparatus 72 is achieved.

Figure 16B:
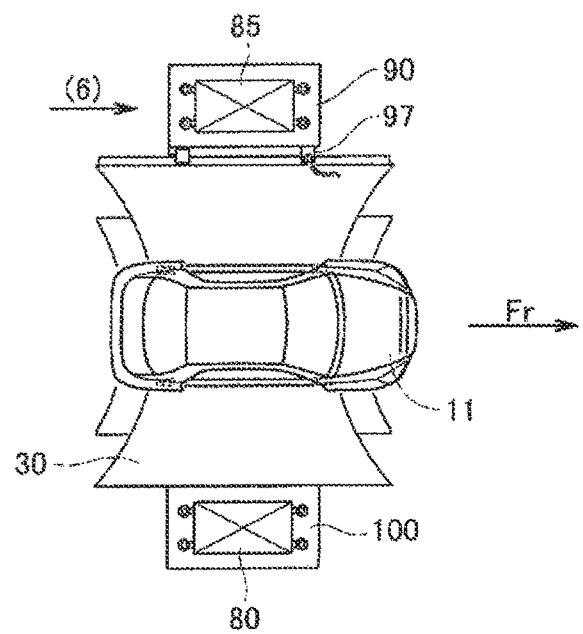

After loading the vehicle body 11 into the constricted cart 30, at or around the timing of switching from high speed to low speed, as shown in FIG. 16B, the left sub-cart 90 is moved forward relatively to the original position (arrow (6)), and the lock pin 97 is attached to the left sub-cart 90.

Figure 17:
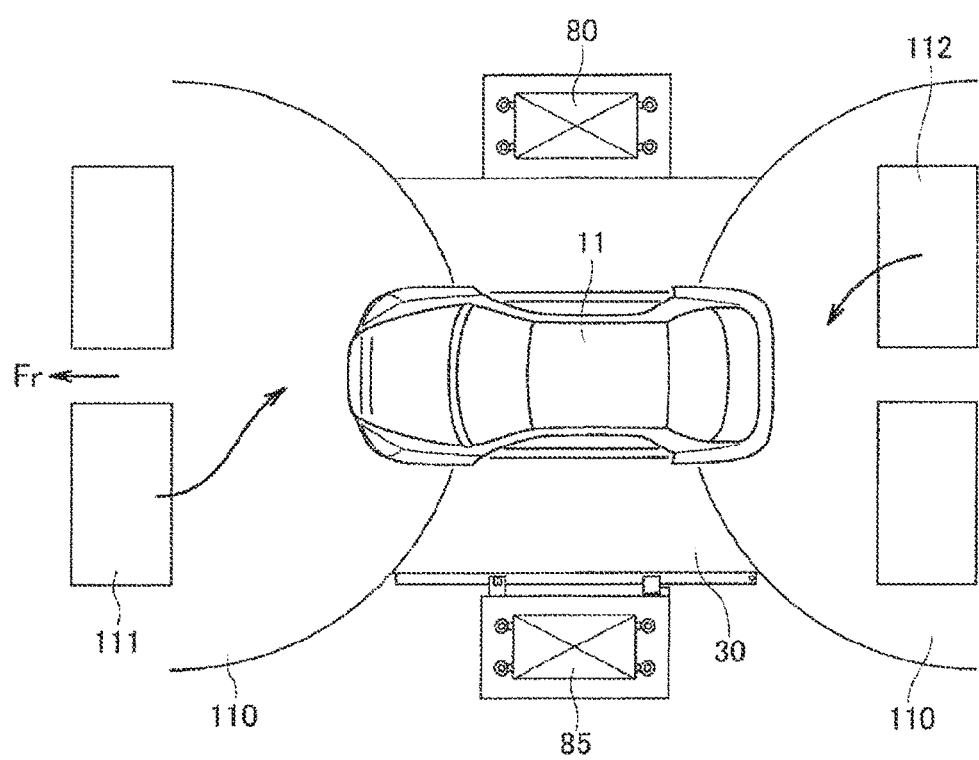
FIG. 17 is a view showing the procedure of assembling parts to the workpiece.

In the work area 73 of FIG. 7, parts are assembled to the vehicle body 11. That is, as shown in FIG. 17, parts stored in the first parts shelf 111 are attached to the front portion of the vehicle body 11, parts stored in the second parts shelf 112 are attached to the rear portion of the vehicle body 11, parts stored in the third parts shelf (left parts shelf) 85 are attached to the left portion of the vehicle body 11, and parts stored in the right parts shelf 80 is assembled to the right portion of the vehicle body 11.

In the second high speed area 69 shown in FIG. 7, the vehicle body 11 is unloaded from the cart 10. This operation of unloading the vehicle body 11 from the cart 10 is performed smoothly in the same manner as in the case of FIGS. 16A, 16B.

Figure 18:
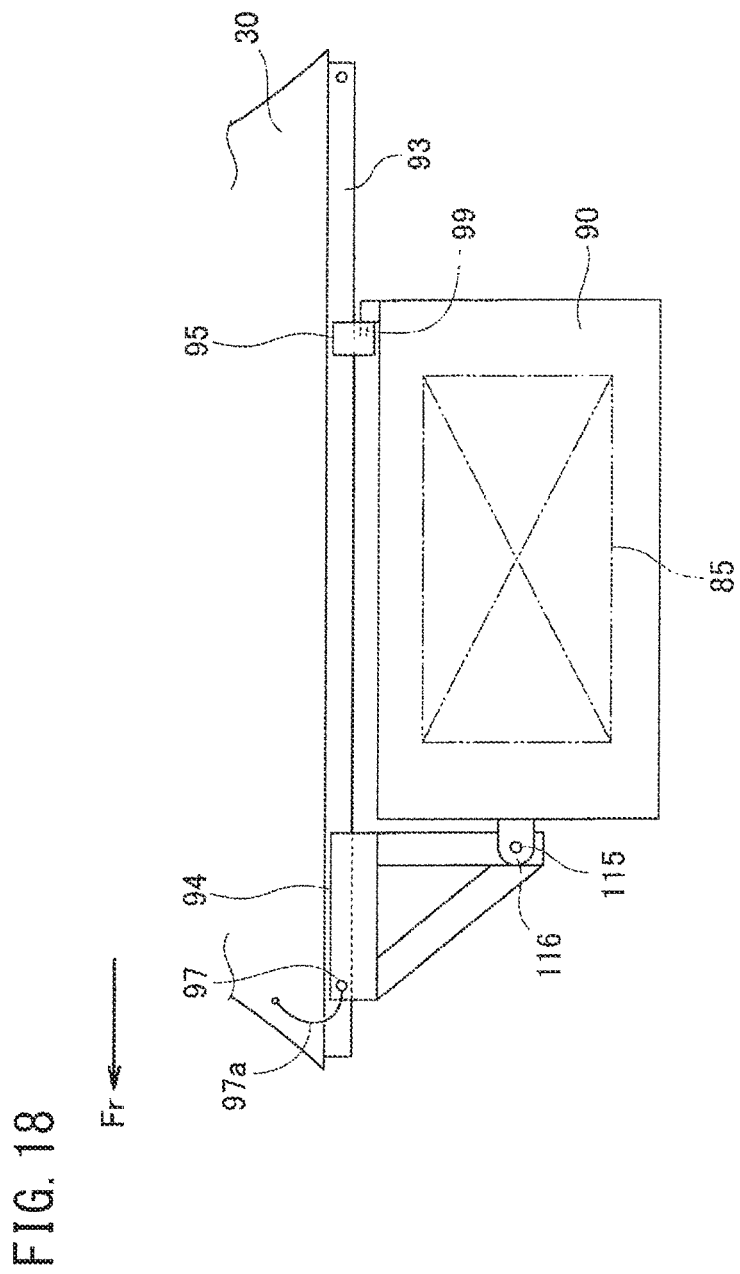
FIG. 18 is a view showing a modified example of the left sub-cart.
Figure 19:
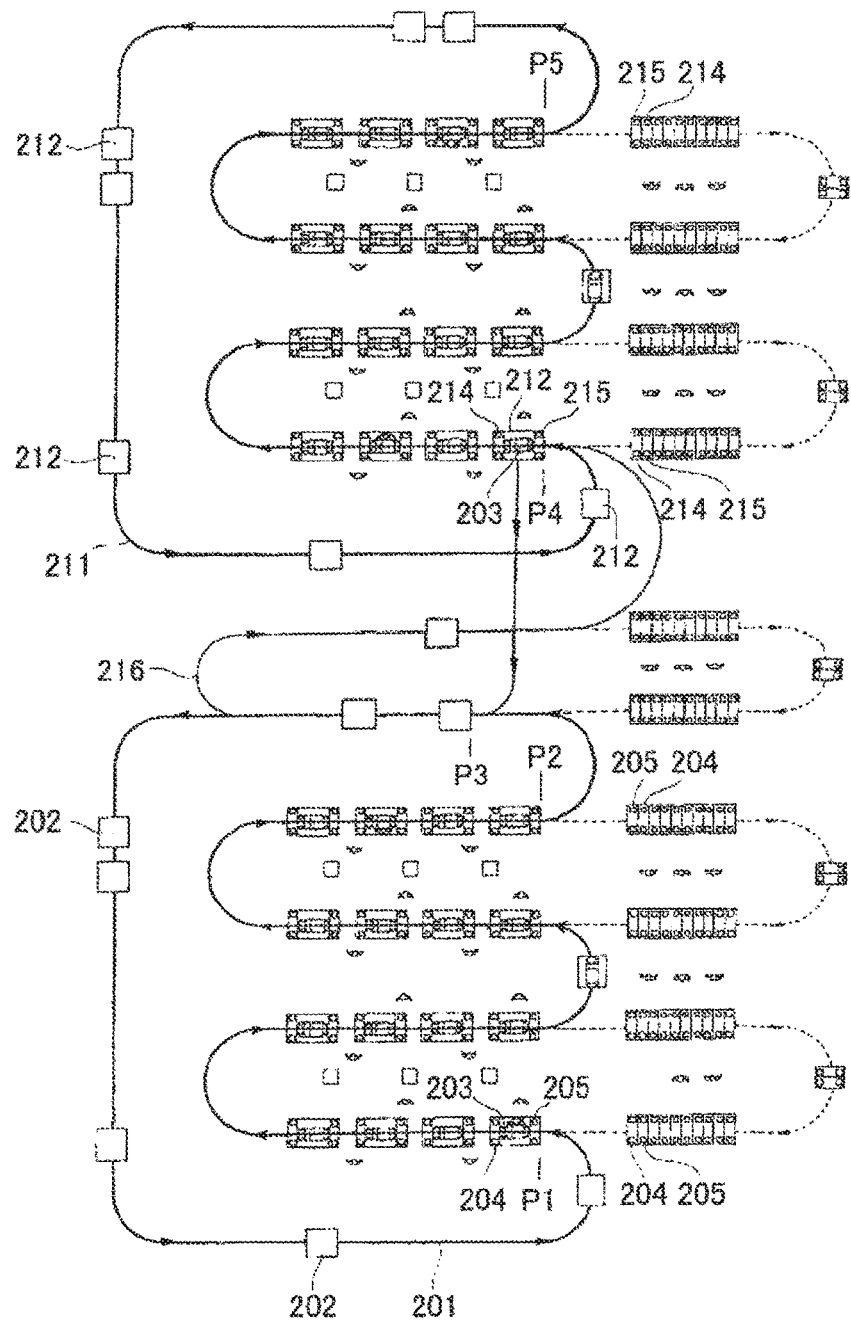
FIG. 19 is a diagram showing a conventional vehicle production line.

Next, a modified example of the left sub-cart 90 will be described. As shown in FIG. 18, the front slider 94 has a right triangular shape. A hook 116 extends from the center of the front side of the left sub-cart 90. This hook 116 is coupled to the front slider 94 using a pin 115. Since the left sub-cart 90 is towed at its central point in the vehicle width, even in the case where the fitting pin 99 is detached from the rear slider 95, the left sub-cart 90 is not swayed to the left or right significantly. Therefore, the left sub-cart 90 can move straight with a higher degree of stability.

In the embodiment, since the left sub-cart is positioned outside the closed transportation path, the left sub-cart is provided movably for the constricted cart. In the case where the left sub-cart is positioned outside the closed transportation path, the right sub-cart may be movable. Further, both of the left and right sub-carts may be provided movably for the constricted cart.

In the embodiment, the constricted cart is used as the cart on which the workpiece is placed. However, the cart may take any form. Further, the workpiece may not be the vehicle body as long as the workpiece is a casing before assembling of parts to the workpiece. The workpiece may be of any type, or may have any structure. It should be noted that the present invention is suitably applicable to vehicle production lines where there is a strong need to improve the productivity.

Further, in the embodiment, as shown in FIG. 1, the cart 10 is formed by one cart apparatus 20 and one circular cart 110. Alternatively, the cart 10 may be formed by a plurality of cart apparatuses 20 and a plurality of circular carts 110. In the case where a plurality of carts 110 are used, it is possible to handle workpieces using a large number of parts.

Further, in the work area 73 shown in FIG. 7, in addition to or instead of operation of attaching parts, other types of operation such as machining operation may be performed.

INDUSTRIAL APPLICABILITY

The present invention is suitably applicable to vehicle production lines.

DESCRIPTION OF REFERENCE NUMERALS

11: workpiece (vehicle body)
15: drive source (pinch roll)
17: control unit
20: cart apparatus
30: cart (constricted cart)
40: guide rail
60: workpiece transportation apparatus
61: first low speed movement path
62: first high speed movement path
63: second low speed movement path
64: second high speed movement path
65: closed transportation path
66: first low speed area
67: first high speed area
68: second low speed area
69: second high speed area
71: parts supply area
72: first workpiece transfer apparatus
73: work area
74: second workpiece transfer apparatus
78: outside of closed transportation path
79: inside of closed transportation path
80: right parts shelf (fourth parts shelf)
81: caster
85: left parts shelf (third parts shelf)
90: left sub-cart
93: elongated rail
94: front slider
95: rear slider
100: right sub-cart

The invention claimed is:

1. A cart apparatus for transporting a workpiece, the cart apparatus comprising:
   a cart configured to travel on a closed transportation path, the workpiece being placed on the cart;
   a left sub-cart provided along a left side of the cart, and towed by the cart;
   a left parts shelf placed on the left sub-cart;
   a right sub-cart provided along a right side of the cart, and towed by the cart; and
   a right parts shelf placed on the right sub-cart,
   wherein the left parts shelf is transferred from outside of the closed transportation path to the left sub-cart, and the right parts shelf is transferred from the outside of the closed transportation path to the right sub-cart, and
   wherein at least one of the left sub-cart and the right sub-cart is attached to the cart so as to be movable relative to the cart in a travel direction of the cart.

2. The cart apparatus according to claim 1, wherein each of the left parts shelf and the right parts shelf has a caster;
   upper surfaces of the left sub-cart and right sub-cart are at same level with an upper surface of the cart; and
   the cart includes a guide rail configured to guide the left parts shelf when the left parts shelf moves toward the right sub-cart or guide the right parts shelf when the right parts shelf moves toward the left sub-cart.

3. A method of transferring a workpiece by loading the workpiece on or unloading the workpiece from a cart configured to travel on a closed transportation path, the method comprising the steps of:
   using a cart apparatus, the cart apparatus comprising the cart, a left sub-cart provided along a left side of the cart and towed by the cart, a left parts shelf placed on the left sub-cart, a right sub-cart provided along a right side of the cart and towed by the cart, and a right parts shelf placed on the right sub-cart, the left sub-cart being attached to the cart movably in a travel direction; and
   at time of transferring the workpiece, moving a sub-cart positioned outside the transportation path backward to load the workpiece on or unload the workpiece from the cart, from outside of the transportation path.

4. The method of transferring the workpiece according to claim 3, wherein at the time of replacing a parts shelf positioned inside the transportation path, among the left parts shelf and the right parts shelf, the left sub-cart is positioned on a left side of the cart and the right sub-cart is positioned on a right side of the cart, and the parts shelf positioned inside the transportation path is moved to the sub-cart positioned outside the transportation path via the cart.

* * * * *